UNITED STATES PATENT OFFICE 2,681,919

4,7,9(11)-PREGNATRIENE-3,12,20-TRIONE AND PROCESS

Robert H. Levin, A. Vern McIntosh, Jr., and George B. Spero, Kalamazoo, Mich., assignors to The Upjohn Company, Kalamazoo, Mich., a corporation of Michigan No Drawing. Application January 2, 1952, Serial No. 264,648

5 Claims. (Cl. 260—397.3)

The present invention relates to a steroid compound, 4,7,9(11)-pregnatrien-3,12,20-trione, and to a process for its production.

This application is a continuation-in-part of our copending application Serial No. 184,702, filed September 13, 1950, now Patent No. 2,623,043, to which reference is made also for the preparation of the starting compounds referred to in this specification.

The 4,7,9(11)-pregnatrien-3,12,20-trione of this invention is represented by the following formula:

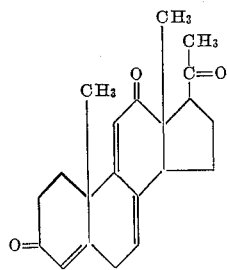

The principal object of the present invention is to provide the novel compound, 4,7,9(11)-pregnatrien - 3,12,20 - trione. Another object of the present invention is to provide a process for the production of this new compound. Other objects and advantages of the invention, some of which are referred to hereinafter, will be apparent to those skilled in the art to which the invention pertains.

The compound of the present invention is useful in the preparation of steroid compounds having an oxygen atom attached to carbon atom 11, for example the 4,7,9(11) - pregnatrien - 3,12,20-trione may be reduced with hydrogen to pregnane-3,12,20-trione [Selye, Encyclopedia of Endocrinology, Section I, volume IV, 1943, A. W. T. Franks Publishing Company, Montreal, p. 603], and the product thus-produced converted by known procedures to an 11-oxygenated steroid. Such oxygen-containing steroids are of particular interest because of the biological activity of the adrenal cortical hormones and certain known derivatives thereof, which differ markedly in their biological effects from steroids which lack oxygen in their structure. Because of the acute shortage of adrenal cortical hormones and the lack of methods for their synthesis, the compound of the present invention is an extremely useful starting material for the production of oxygen-containing steroids possessing desirable biological activity.

The starting compound from which 4,7,9(11)-pregnatrien-3,12,20-trione is prepared in accordance with the process of our invention is 3β-hydroxy-5,7,9(11)-pregnatrien-12-20-dione, which can be obtained as originally disclosed in our copending application Serial No. 184,702, filed September 13, 1950, now Patent No. 2,623,043, by procedures which consist essentially of the following:

(1) Dehydroergosterol is converted to a 5,8-adduct with maleic anhydride or maleic acid [H. Honigmann, Annalen 508, 89–98 (1934)].

(2) The dehydroergosterol adduct is esterified at the three position by reaction, for example, with benzoyl chloride, acetyl chloride, or formic acid.

(3) The resulting 3β-acyloxydehydroergosterol adduct is ozonized and the ozonide reductively decomposed in acetic acid solution with zinc dust to obtain a 3β-acyloxybisnor-5,7,9(11) - cholatrien-22-al adduct. (See application of Robert H. Levin, Serial No. 111,100, filed August 18, 1949, now Patent No. 2,620,337, for details.)

(4) An enol ester of the resulting 3β-acyloxybisnor-5,7,9(11)-cholatrien-22-al adduct is prepared by reaction with the anhydride of an acid in the presence of a metal-salt of the acid, the enol ester is ozonized, and the ozonide decomposed to produce a 3β-acyloxy-5,7,9(11)-pregnatrien-20-one adduct as described in our copending applications Serial No. 111,974, filed August 23, 1949, now Patent No. 2,620,338, and Serial No. 121,224, filed October 13, 1949, now Patent No. 2,636,031.

(5) The resulting 3β-acyloxy-5,7,9(11)-pregnatrien-20-one adduct is reacted with N-bromosuccinimide or bromine to produce a 3β-acyloxy-12-bromo-5,7,9(11)-pregnatrien - 20 - one adduct as described in our copending application Serial No. 184,702, filed September 13, 1950, now Patent No. 2,623,043.

(6) The 3β-acyloxy-12-bromo-5,7,9(11) - pregnatrien-20-one adduct, on reaction with silver nitrate yields a 3β-acyloxy-12-hydroxy-5,7,9(11)-pregnatrien-20-one adduct.

(7) The 3β-acyloxy - 12 - hydroxy - 5,7,9(11)-pregnatrien-20-one adduct is then oxidized with chromic acid, to obtain a 3β-acyloxy-5,7,9(11)-pregnatrien-12,20-dione adduct.

(8) The adduct radical of the resulting 3β-acyloxy-5,7,9(11)-pregnatrien-12,20-dione adduct is then removed by heating the adduct in the presence of an amine, to obtain a 3β-acyloxy-5,7,9(11)-pregnatrien-12,20-dione, as more fully described and claimed in our copending application Serial No. 228,134, filed May 24, 1951.

(9) The resulting 3β-acyloxy-5,7,9(11)-pregnatrien-12,20-dione is saponified with aqueous base, as described in our copending application Serial No. 231,904, filed June 15, 1951, now Patent No. 2,628,240, to produce 3β-hydroxy-5,7,9(11)-pregnatrien-12,20-dione.

In accordance with the process of this invention the 3β-hydroxy-5,7,9(11)-pregnatrien-12,20-dione is converted to the desired 4,7,9(11)-pregnatrien-3,12,20-trione by oxidation with an oxidizing agent such as, for example, aluminum isopropoxide with cyclohexanone, chromic acid, N-bromoacetamide, or an alkali-metal dichromate, with the latter being the preferred agent. Along with the conversion of the hydroxy group to the ketone group, an electron shift occurs in which the double bond in the 5-position migrates to the 4-position, thereby causing the intermediate 5,7,9(11)-pregnatrien-3,12,20-trione to isomerize and form 4,7,9(11)-pregnatrien-3,12,20-trione. The starting 3β-hydroxy-5,7,9(11)-pregnatrien-12,20-dione is dissolved in an organic solvent which is substantially water-immiscible. Solvents such as benzene, toluene, chloroform, ethyl acetate, normal hexane, ortho-chlorotoluene, carbon tetrachloride, and chlorobenzene may be advantageously employed, the latter solvent being preferred. The proper solvent is one which readily dissolves the steroid, is substantially nonreactive with the reactants and reaction products, and is substantially immiscible with water. The oxidizing media is prepared by dissolving an alkali-metal dichromate salt in water, the hydrated sodium dichromate ($Na_2Cr_2O_7.2H_2O$) being the preferred dichromate salt, although other dichomate or even chromate salts can be used. To the resulting aqueous alkali-metal dichromate solution is added an acid, for example, a mineral acid, such as sulfuric acid, or a sulfonic acid, such as para-toluene-sulfonic acid. The function of the acid is merely to furnish hydrogen ions in the oxidizing media and, therefore, acids such as sulfuric, phosphoric, and the like, may be employed. The solution of the starting 3β-hydroxy-5,7,9(11)-pregnatrien-12,20-dione in the organic solvent is then admixed with the aqueous oxidizing media, formed by reaction of the alkali-metal dichromate solution with the acid, at a temperature below about thirty degrees centigrade, a temperature range of from about minus thirty degrees centigrade to about thirty degrees centigrade being entirely satisfactory with about minus ten to plus ten degrees centigrade being the preferred temperature range. The order of mixing the reactants is not critical and admixing of the solutions is generally conducted by adding small portions of one solution to the other at the indicated temperatures, accompanied by continual stirring or other agitation. Upon completion of the oxidation, usually in from about one-half to eight hours, with about two hours being preferred, the organic layer is separated from the aqueous layer by conventional separation procedures. The aqueous layer may then be extracted with successive portions of benzene or other organic solvent which is substantially water-immiscible and in which the product is soluble. The organic extracts are separated and combined with the first organic layer and the combined organic solution is then washed with successive portions of water and sodium bicarbonate solution to remove any acidic material. The oxidized product may then be recovered from the organic layer by conventional procedure, such as drying over anhydrous sodium sulfate, filtering and concentrating to give the desired 4,7,9(11)-pregnatrien-3,12,20-trione. Other conventional procedures for the separation of the product are satisfactory and may be employed if desired.

The following example is illustrative of the process and product of the present invention, but is not to be construed as limiting the scope of this invention.

*Example.—4,7,9(11)-pregnatrien-3,12,20-trione*

One hundred fifty milligrams of 3β-hydroxy-5,7,9(11)-pregnatrien-12,20-dione was mixed with 5.3 milliliters of chlorobenzene and the resulting chlorobenzene solution added, in small portions, with continual stirring, to a mixture obtained by dissolving 707 milligrams of hydrated sodium dichromate ($Na_2Cr_2O_7.2H_2O$) in 3.1 milliliters of water with 0.93 milliliter of concentrated sulfuric acid maintained in an ice-bath, and the resulting reaction mixture stirred for an additional two hours in an ice-bath. The chlorobenzene and aqueous layers were separated, and the aqueous layer extracted with two successive portions of benzene. The combined chlorobenzene and benzene layers were separated from the aqueous layer and washed successively with two fifty-milliliter portions of water, one 100-milliliter portion of saturated sodium bicarbonate solution, and two fifty-milliliter portions of water. The organic layer was separated from the aqueous washings, dried over anhydrous sodium sulfate, filtered, and concentrated to give the desired 4,7,9(11)-pregnatrien-3,12,20-trione as a light straw-colored, viscous oil.

*Analysis.* Percent calculated for $C_{21}H_{24}O_3$: C, 77.75; H, 746. Found: C, 77.68; H, 7.35.

It is to be understood that the invention is not to be limited to the exact details of operation or the exact compound shown and described, as obvious modifications and equivalents will be apparent to one skilled in the art, and the invention is therefore to be limited only by the scope of the appended claims.

We claim:

1. 4,7,9(11)-pregnatrien-3,12,20-trione.

2. A process for the production of 4,7,9(11)-pregnatrien-3,12,20-trione which comprises the oxidation of the 3-hydroxy group of 3β-hydroxy-5,7,9(11)-pregnatrien-12,20-dione with an oxidizing agent which provides at least one gram atom of oxygen per mole of steroid, and subsequently recovering the resulting 4,7,9(11)-pregnatrien-3,12,20-trione.

3. A process for the production of 4,7,9(11)-pregnatrien-3,12,20-trione which comprises the oxidation of the 3-hydroxy group of 3β-hydroxy-5,7,9(11)-pregnatrien-12,20-dione dissolved in a water-immiscible organic solvent by stirring with an acidified aqueous solution of an alkali-metal dichromate, and subsequently recovering the resulting 4,7,9(11)-pregnatrien-3,12,20-trione.

4. A process for the production of 4,7,9(11)-pregnatrien-3,12,20-trione which comprises the oxidation of the 3-hydroxy group of 3β-hydroxy-5,7,9(11)-pregnatrien-12,20-dione dissolved in a water-immiscible organic solvent by stirring for about one-half to about eight hours with an acidified aqueous solution of sodium dichromate at a temperature between about minus thirty degrees centigrade to about plus thirty degrees centigrade, and subsequently recovering the resulting 4,7,9(11)-pregnatrien-3,12,20-trione.

5. A process for the production of 4,7,9(11)-pregnatrien-3,12,20-trione which comprises the oxidation of the 3-hydroxy group of 3β-hydroxy-5,7,9(11)-pregnatrien-12,20-dione dissolved in chlorobenzene by stirring for about two hours at a temperature between about zero degrees centigrade and about plus ten degrees centigrade with an aqueous solution containing sodium dichromate and sulfuric acid, and subsequently recovering the resulting 4,7,9(11)-pregnatrien-3,12,20-trione.

References Cited in the file of this patent

UNITED STATES PATENTS

| Number | Name | Date |
|---|---|---|
| 2,175,220 | Schoeller | Oct. 10, 1939 |
| 2,313,732 | Butenardt | Mar. 16, 1943 |
| 2,341,594 | Butenardt | Feb. 15, 1944 |